United States Patent [19]

Dewar et al.

[11] Patent Number: 5,169,338
[45] Date of Patent: Dec. 8, 1992

[54] BATTERY CONNECTOR COVER

[75] Inventors: John H. Dewar, Grosse Ile; Thomas F. Rahrig, Woodhaven; Steven F. Gawron, Warren, all of Mich.

[73] Assignee: United Technologies Automotive Inc., Dearborn, Mich.

[21] Appl. No.: 805,443

[22] Filed: Dec. 10, 1991

[51] Int. Cl.⁵ .................................. H01R 13/44
[52] U.S. Cl. .................. 439/522; 174/138 F; 429/65
[58] Field of Search ............ 439/202, 521, 522; 174/138 F; 429/65

[56] References Cited

U.S. PATENT DOCUMENTS

| | | |
|---|---|---|
| 2,145,135 | 1/1939 | Ryalls. |
| 2,671,819 | 3/1954 | Field .................... 136/170 |
| 2,800,522 | 7/1957 | Coleman et al. ............ 439/522 |
| 3,867,007 | 2/1975 | Wening .................... 439/726 |
| 4,012,104 | 3/1977 | Wening .................... 439/522 |
| 4,288,504 | 9/1981 | Julian et al. ............. 439/522 |
| 4,562,125 | 12/1985 | Davis ...................... 429/65 |
| 4,576,430 | 3/1986 | Dufresne .................. 439/521 |
| 4,698,459 | 10/1987 | Drake ...................... 174/138 |
| 4,778,408 | 10/1988 | Morrison .................. 439/522 |
| 4,795,857 | 1/1989 | McInnis .................... 439/521 |
| 4,952,168 | 8/1990 | Schieferly et al. .......... 439/467 |
| 4,952,171 | 8/1990 | Sugiyama .................. 439/522 |
| 4,988,309 | 1/1991 | Garretson ................. 439/521 |
| 5,021,305 | 1/1991 | Turner ..................... 429/65 |

*Primary Examiner*—Neil Abrams
*Attorney, Agent, or Firm*—Jodi A. Medeiros

[57] ABSTRACT

A battery connector cover (10) having an insulative body (12) locked over a battery terminal (18) and a cable connector (16) for electrically insulating the battery terminal (18) and connector (16). The connector cover (10) is locked in a closed position at one end by a locking detent (24) and is secured at its opposite end to battery cables (14) via a cable lock (40). The cover includes an integral hinge (36) disposed between the two ends so as to provide easy access to the battery terminal (18) and connector (16).

5 Claims, 2 Drawing Sheets

BATTERY CONNECTOR COVER

TECHNICAL FIELD

This invention relates to battery connector covers, and more particularly to insulating covers for protecting motor vehicle batteries from the possibility of short circuiting.

BACKGROUND ART

Covers are used for protecting batteries from undesirable elements in a variety of applications. Some covers encase the entire battery while others cover certain portions thereof. In the automotive industry covers are currently used to protect battery terminals and cable connectors, and in particular the positive terminal, from corrosive elements caused by acidic fumes given off by the battery which builds up on or between the terminals and cable connectors. There are several known means by which the battery terminals and cable connectors are covered and hence protected.

One cover for automotive terminals as described in U.S. Pat. No. 4,576,430, comprises a dielectric block for encasing the conductive portions of the terminals and cable connectors, thereby insulating the battery from corrosive elements. The cover further comprises a conductive sleeve extending outwardly from the dielectric block to provide a lodation for attaching cables when jump starting the motor vehicle.

Another cover presently utilized in the automotive industry is a sealed surface cover which encloses the entire top portion of the battery and includes a terminal cover which extends from the surface cover to create an overhang above the positive and negative terminals. This type of cover is usually only capable of protecting terminals which are located on the top of the battery; terminals on the side of the battery are, therefore, typically not covered.

Some conventional automotive battery terminal and connector covers are often incapable of keeping the cover secure while the motor vehicle is in operation because they simply rest on top of the battery and are not locked in a closed position. One such conventional cover utilizes a flexible, rubber boot which slideably receives a battery cable therethrough and lays over the terminal and cable connector. These flexible rubber covers have a tendency to slide along the battery cable and often become dislocated and damaged during normal vehicle operation.

Another difficulty encountered with present cover designs is providing easy access to the battery terminals and connectors for servicing the battery and jump starting the car. Many conventional covers utilize a thin, flexible plastic strap to secure the cover to the battery cable. A basic problem associated with such covers is that the strap is easily distorted and broken after being used to access the terminals and cable connectors.

Most conventional covers also leave a dangerous, exposed conductive area on the battery terminals which if bridged with a conductive tool will in all likelihood short-circuit the battery. Additionally, many connector covers currently used, present quality control problems for manufacturers because they must be manually installed and are, therefore sometimes installed incorrectly or not at all. These manually installed covers are positioned about the battery cables before the cables are crimped to the battery connectors and terminals; therefore the cover must be manually moved out of the way so that the operator can cut and strip the insulation around the battery cables in order to hand crimp the cables to the battery connectors. Hand crimping creates quality control problems because of human error, is often time consuming, and more costly than automated assembly.

The cover of U.S. Pat. No. 4,698,459 may solve some of the aforementioned problems associated with conventional cable connector covers. That cover locks shut while still allowing access to the battery terminals and connectors and comprises a one-piece molded housing having a base with a bore for receiving a battery terminal therethrough and a cap for enclosing the battery terminals and connectors, the base and the cap being hingedly connected at the battery terminal end. This connector cover receives the battery cable through a cable collar that projects outwardly from both the base and the cap. Although this cover provides corrosion protection for the battery terminal and connector, it has several disadvantages associated with it. One such disadvantage is that the connector cover must be placed over the battery terminal before the battery cables and connectors are attached to the battery terminal. This can be a very awkward process because the assembler must open the cover so that it is out of the way while making sure the bore in the base of the cover stays over the battery terminal and then attempt to attach the cable connector to the same battery terminal. This process is all done by hand because the connector cover is not adapted for automated assembly to the battery cable or connector. Additionally, the connector cover can be difficult to open because the base must be pinched in while the cap is pulled off and the cover, therefore usually requires two hands to open. Once the cover is opened, the battery cable located at the base of the connector is uncovered thereby exposing a dangerous conductive area of the battery cable that is not covered by insulation. This conductive area, if bridged with a conductive tool, could cause the battery to short circuit, the operator to be injured, and the cable to be damaged. Because the battery cable is received within the cover by a molded cable collar, the size of the battery cable the connector cover can accommodate is limited which renders the cover limited to use with only a narrow range of cable sizes. Finally, the connector cover must be shipped separately from the associated cable because the cover does not include any means to position and hold it onto the cable; therefore it is more costly to ship, handle, and store.

DISCLOSURE OF THE INVENTION

An object of the present invention is to provide a new and improved battery cable connector cover which electrically insulates a battery to protect the battery from short circuiting.

Another object of the invention is to provide such a cover which locks shut in order to prevent dislocation of the cover.

A further object of the invention is to provide such a cover which is easy and convenient to open in order to access a battery terminal and connector thereunder without exposing the conductive portions of the battery cable.

A still further object of the invention is to provide such a cover which is permanently fastened to battery cables, is easy to install, and is adapted for automated assembly.

According to the present invention, a battery connector cover includes an insulative body which is locked when in a closed position over a battery terminal and cable connector by a locking detent at one end, is secured at its opposite end to battery cables via a cable lock, and includes an intergral hinge disposed between the two ends so as to provide easy access to the battery terminal and connector.

The connector lock holds the cover in a closed position by utilizing a locking detent which engages with a fastening tab on the connector to prevent the cover from becoming disengaged from the battery terminal.

The rear of the connector cover is secured to and encloses the battery cables via the cable lock which employs wing shaped locks that snap lock to a centrally located wall in the cover to form two individual cable compartments. The two compartments accommodate either right hand or left hand battery cable locations from the battery cable end and can house the maximum size and number of battery cables currently utilized in motor vehicles.

The cover is hinged in between the cable lock and the connector lock by means of an integral hinge to allow the connector cover to be selectively and conveniently lifted when the locking detent is purposefully disengaged so as to access the battery terminal and connector without exposing the conductive portions of the battery cable.

The connector cover provides a reliable means for electrically insulating the battery terminals and connectors, thus protecting the battery from the possibility of short circuiting when touched with a tool. The cover is easily and inexpensively manufactured, adapted for automated assembly, durable, and allows easy access to the battery terminals and connectors for servicing the battery or jump starting the motor vehicle. The connector cover may also be made out of any material that is non-conductive, capable of being formed into the proper configuration, and suitable for an automotive environment.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
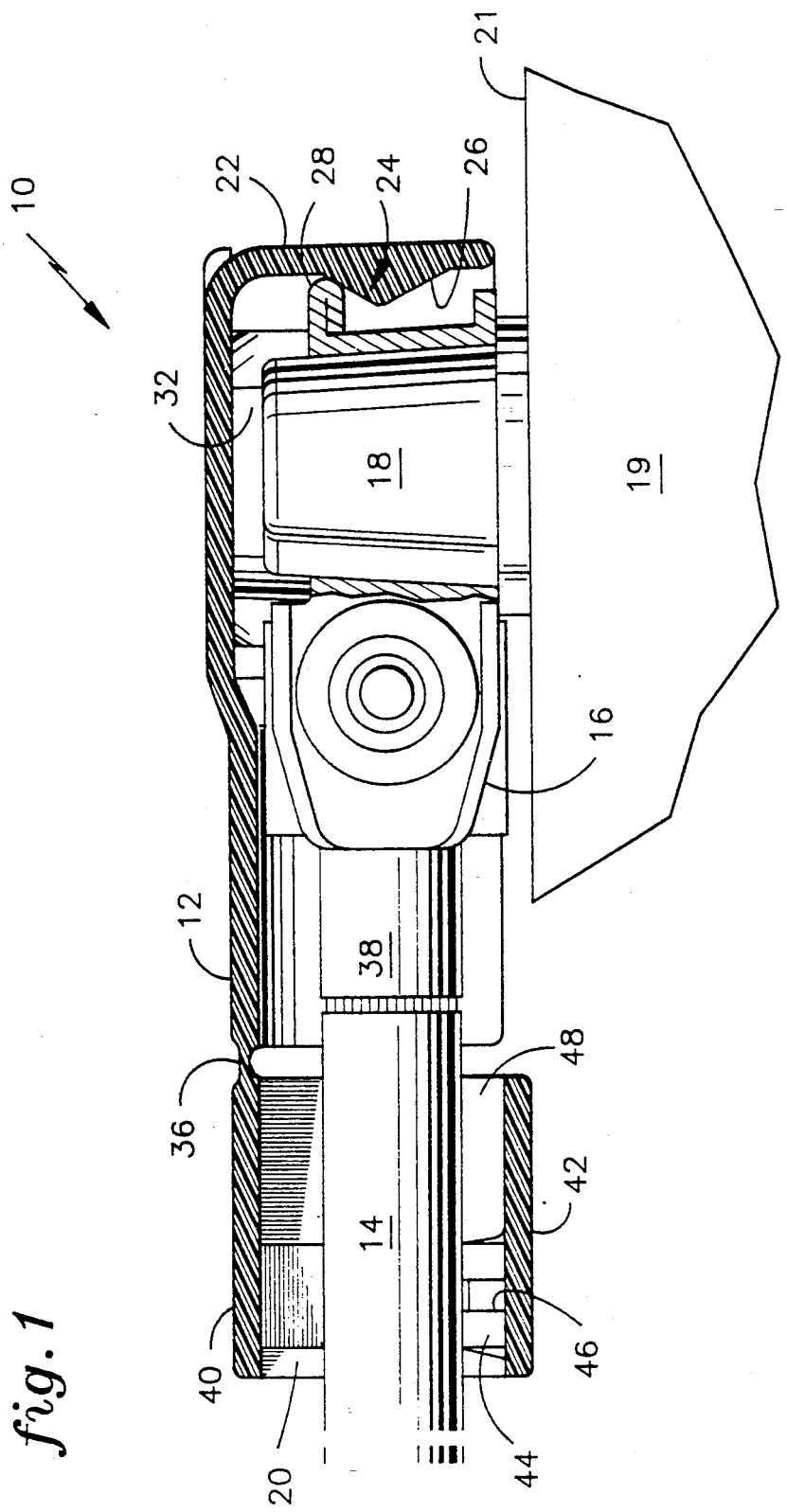
FIG. 1 is a sectioned, partially broken away, side elevational view of a battery connector cover of the present invention and an associated battery terminal and connector.
Figure 2:
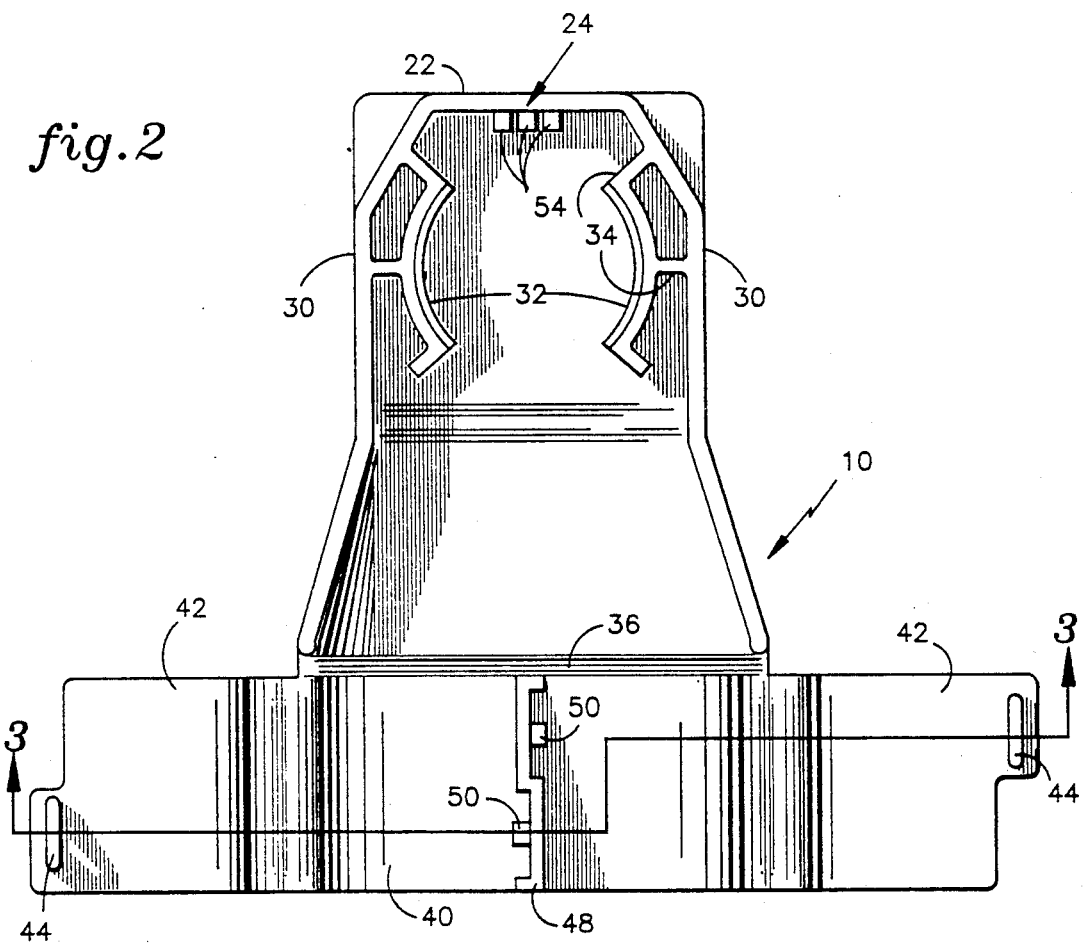
FIG. 2 is a bottom, plan view of the connector cover of FIG. 1.
Figure 3:
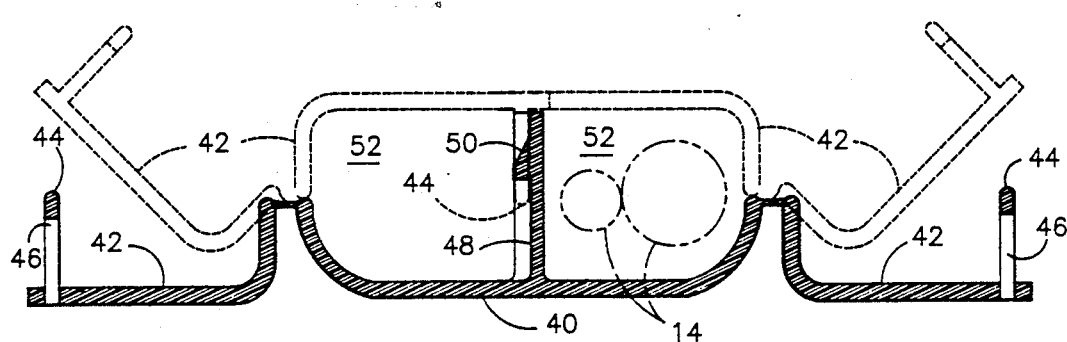
FIG. 3 is an end view taken in the direction of line 3—3 of FIG. 2.

Referring now to FIGS. 1-3, a battery connector cover 10 includes an insulative body 12 attached at the rear to battery cables 14 and extending forwardly to enclose a cable connector 16 and battery terminal 18 which projects vertically upward from a battery 19 whose surface 21 is substantially horizontal.

The rear 20 of the connector cover 10 is open to house the battery cables 14 while the forward end comprises a vertical, frontal wall 22. The connector cover 10 includes a locking means (detent)24 comprising a projection integrally formed in the interior surface of the frontal wall 22 for locking the cover in a closed position. The locking detent 24 has an inclined surface 26 which extends from the center of the wall 22 and is positioned beneath a mating, fastening tab 28 which protrudes from the cable connector 16 to form a locking relationship which secures the cover 10 in place. The inclined surface 26 provides a means for installing, removing, and fastening the connector cover 10. The locking detent 24 is designed with three separate ramped ribs 54 to prevent shrink marks on the connector cover 10 when molded. Perpendicular to the frontal wall 22 are two vertical side walls 30 whose interior surface comprises integrally formed, projecting, semicircular walls 32 with supporting ribs 34 which closely align the cover 10 about the connector 16 (FIG. 2). When the connector cover 10 is being installed the semi-circular walls 32 align the cover with the connector 16 and aid in positioning the cover 10 about the connector 16 below the fastening tab 28 to automatically lock the cover 10 shut.

The rear of the connector cover 10 is permanently attached to the battery cables 14 via a cable lock 40 (FIG. 3). The cable lock 40 comprises winged locks 42 with end tabs 44 having longitudinal slots 46 which snap lock to a vertical, centrally located wall 48 that protrudes upwardly from the rear base of the connector cover 10. Latching is achieved by snapping a ramped shoulder 50 disposed in the centrally located wall 48 into the longitudinal slots 46 of the locking tabs 44. When the cable lock system 40 is hinged shut, two individual cable compartments 52 are created so as to accommodate either right or left hand battery cables 14 from the cable connector 16 end. The cable compartments 52 are designed to house all sizes and numbers of cables 14 currently utilized in the automotive industry.

The battery connector cover 10, unlike prior art covers, is capable of being automatically installed onto the battery cables 14 and automatically locked shut about the cable connector 16 after the battery cables 14 are crimped to the cable connector 16. This eliminates the problem of having to manually move the connector cover 10 out of the way in order to out and strip the insulation around the battery cables 14 before crimping the cables 14 to the cable connectors 16. Because the battery connector cover 10 is automatically installed after crimping, there is no need to move the connector cover 10 out of the way and thus, the cut, strip, and crimping process can also be automated. Additionally, because the connector cover 10 is first attached to both the battery cable 14 and the cable connector 16, when the cable connector 16 is ready to be attached to the battery terminal 18 the cover 10 is simply opened and flipped out of the way to expose the connector 16 while remaining locked onto the battery cable 14 at the opposite end.

Automation of the battery connector cover 10 is made possible by the cable locks 40 which are capable of being automatically snapped around the battery cables 14 by a machine and also by the locking detent 24, fastening tab 28, and semi-circular walls 32. The semi-circular walls automatically align the cover 10 about the cable connector 16 and immediately thereafter the cover 10 is secured shut by a machine which positions the locking detent 24 beneath the fastening tab 28. The connector cover 10 is secured shut at the same time and by the same machine that snaps the cable locks 40 about the battery cables 14. By attaching and locking the connector cover 10 to both the battery cables 14 and the cable connectors 16 the covers 10 can be shipped with the battery cables 14 and the connectors 16 and are, therefore, not likely to be displaced or tangled with the battery cables 14 or cable connectors 16.

The connector cover 10 is easily opened by pulling up on the front of the cover 10 to disengage the locking detent 24 from the fastening tab 28. Once the locking tab 24 is disengaged an integral hinge 36 disposed within the connector cover 10 between the terminal 18 and the cable connector 16 enables the front of the cover 10 to be lifted to access the battery terminal 18 and cable connector 16 without exposing any conductive portion of the battery cable 14. The hinge 36 provides easy, convenient access to the both the terminal 18 and the cable connector 16 and unlike prior art covers is not likely to distort or break.

The connector cover 10 may be made out of any material, such as plastic, with suitable properties, for example non-conductive and corrosion and heat resistant, which is appropriate for the environment in which it is to be used.

Although the invention has been shown and described with respect to exemplary embodiments and thereof, it should be understood by those skilled in the art that various changes, omissions, and additions may be made therein and thereto, without departing from the spirit and the scope of the invention. To the extent that the design of the preferred embodiment is determined by the environment, it will be appreciated that changing the structure of the environment will necessarily result in modifications of the cover. For example, the battery terminals may be side terminals which extend perpendicularly outward from the battery's lateral surface and the connector may not have an existing fastening tab but would need to be adapted to include an equivalent member for engaging the locking detent.

Having thus described the invention, what is claimed is:

1. A battery connector cover comprising:
   an insulative body attached at one end to a battery cable and extending over a cable connector and a terminal located at an opposite end;
   a cable lock disposed at the one end of said insulative body for locking said cover to the battery cable;
   a locking means disposed at the opposite end of said insulative body, independent of said cable lock, for locking said cover in a closed position about the terminal such that the cover may be unlocked at either the cable or the terminal end and still remain in a secured position at the other end; and
   a hinge disposed within said insulative body between the one and the opposite insulative body ends to allow said cover to be lifted to access the battery terminal and the connector.

2. A battery connector cover according to claim 1, wherein said locking means comprises:
   a locking detent having an inclined surface integrally formed in the interior of said cover at the battery terminal end adapted for engagement with a mating, fastening tab on the connector; and
   a plurality of concentric walls with supporting ribs, outwardly projecting from the interior of said cover at the battery terminal end for aligning said cover and said locking detent about the battery connector in a closed position.

3. A battery connector cover according to claim 1, wherein said cable lock comprises:
   a wall protruding upwardly from the base of said connector cover at the battery cable end;
   opposed winged locks having end locking tabs with longitudinal slots; and
   a ramped shoulder disposed on the wall adapted for engagement with the longitudinal slots to latch the winged locks to the wall, thereby forming two individual cable compartments.

4. Apparatus according to claim 1, wherein said hinge is disposed within the top wall of said insulative body.

5. A cable lock for a battery cable connector cover comprising:
   a wall protruding upwardly from the base of said battery cable connector cover;
   opposed winged locks having end locking tabs with longitudinal slots; and
   a ramped shoulder disposed on the wall adapted for engagement with the longitudinal slots to latch the winged locks to the wall, thereby forming two individual cable compartments for receiving a battery cable.

* * * * *